(12) United States Patent
Schlechte et al.

(10) Patent No.: US 10,293,449 B2
(45) Date of Patent: May 21, 2019

(54) EASY-CLEAN SURFACE AND METHOD OF MAKING THE SAME

(71) Applicant: 3M INNOVATIVE PROPERTIES COMPANY, St. Paul, MN (US)

(72) Inventors: Jay S. Schlechte, Oakdale, MN (US); Patrick J. Hager, Woodbury, MN (US); Jeffrey R. Janssen, Hernando, FL (US); Paul D. Graham, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 100 days.

(21) Appl. No.: 14/891,608

(22) PCT Filed: Apr. 28, 2014

(86) PCT No.: PCT/US2014/035698
§ 371 (c)(1),
(2) Date: Nov. 16, 2015

(87) PCT Pub. No.: WO2014/186113
PCT Pub. Date: Nov. 20, 2014

(65) Prior Publication Data
US 2016/0108257 A1    Apr. 21, 2016

Related U.S. Application Data

(60) Provisional application No. 61/824,608, filed on May 17, 2013.

(51) Int. Cl.
*B24B 1/00* (2006.01)
*B05D 5/00* (2006.01)
(Continued)

(52) U.S. Cl.
CPC ............... *B24B 1/00* (2013.01); *B05D 1/40* (2013.01); *B05D 3/12* (2013.01); *B05D 5/00* (2013.01);
(Continued)

(58) Field of Classification Search
CPC .......... C09D 7/1216; B05D 1/40; B05D 3/12; B05D 5/00
See application file for complete search history.

(56) References Cited

U.S. PATENT DOCUMENTS

| 1,910,444 A | 5/1933 | Nicholson |
| 2,801,185 A | 7/1957 | Iler |

(Continued)

FOREIGN PATENT DOCUMENTS

| CN | 101016615 A | 8/2007 |
| CN | 101048259 A | 10/2007 |

(Continued)

OTHER PUBLICATIONS

Cassie, "Wettability of Porous Surfaces", Transactions of the Faraday Society, 1944, vol. 40, pp. 546-551.
(Continued)

*Primary Examiner* — Kelly M Gambetta
(74) *Attorney, Agent, or Firm* — Bradford B. Wright (57) ABSTRACT

A method of providing an easy-clean, water-sheeting coating on a substrate includes: abrading a surface of a substrate using an abrasive article to provide an abraded surface having a surface roughness R?a#191 in a range of from 100 nm to 3500 nm, contacting a coatable composition with the abraded surface, and removing water from the coatable composition. The coatable composition comprises silica nanoparticles and has a pH of 7.5 or less. A kit including the abrasive article and the coatable composition is also disclosed.

4 Claims, 1 Drawing Sheet (51) Int. Cl.
    *C09D 7/40*            (2018.01)
    *B05D 3/12*            (2006.01)
    *B05D 1/40*            (2006.01)
    *C09D 7/61*            (2018.01)

(52) U.S. Cl.
    CPC ............... *C09D 7/61* (2018.01); *C09D 7/67* (2018.01); *B05D 2601/22* (2013.01)

(56) References Cited

U.S. PATENT DOCUMENTS

| | | |
|---|---|---|
| 3,041,156 A | 6/1962 | Rowse |
| 3,892,573 A | 7/1975 | Tatsuta |
| 4,314,827 A | 1/1982 | Leitheiser |
| 4,522,958 A | 6/1985 | Das |
| 4,623,364 A | 11/1986 | Cottringer |
| 4,744,802 A | 5/1988 | Schwabel |
| 4,770,671 A | 9/1988 | Monroe |
| 4,881,951 A | 11/1989 | Wood |
| 5,009,675 A | 4/1991 | Kunz |
| 5,011,508 A | 4/1991 | Wald |
| 4,997,461 A | 5/1991 | Markhoff-Matheny |
| 5,042,991 A | 8/1991 | Kunz |
| 5,152,917 A | 10/1992 | Pieper |
| 5,188,890 A | 2/1993 | Ohashi |
| 5,201,101 A | 4/1993 | Rouser |
| 5,204,219 A | 4/1993 | Van Ooij |
| 5,213,591 A | 5/1993 | Celikkaya |
| 5,316,812 A | 5/1994 | Stout |
| 5,324,566 A | 6/1994 | Ogawa |
| 5,435,816 A | 7/1995 | Spurgeon |
| 5,454,844 A | 10/1995 | Hibbard |
| 5,464,900 A | 11/1995 | Stofko, Jr. |
| 5,639,546 A | 6/1997 | Bilkadi |
| 5,672,097 A | 9/1997 | Hoopman |
| 5,681,217 A | 10/1997 | Hoopman |
| 5,702,800 A | 12/1997 | Mihayashi |
| 5,814,567 A | 9/1998 | Yahiaoui |
| 5,833,724 A | 11/1998 | Wei |
| 5,851,247 A | 12/1998 | Stoetzel |
| 5,863,306 A | 1/1999 | Wei |
| 5,908,476 A | 6/1999 | Nishio |
| 5,945,211 A | 8/1999 | Yamaguchi |
| 5,981,052 A | 11/1999 | Sugiyama |
| 6,040,053 A | 3/2000 | Scholz |
| 6,048,375 A | 4/2000 | Yang |
| 6,139,594 A | 10/2000 | Kincaid |
| 6,193,378 B1 | 2/2001 | Tonar |
| 6,258,969 B1 | 7/2001 | Sawai |
| 6,293,980 B2 | 9/2001 | Wei |
| 6,432,510 B1 | 8/2002 | Kim |
| 6,525,882 B1 | 2/2003 | Yamamoto |
| 6,591,970 B2 | 7/2003 | Olson et al. |
| 6,599,976 B2 | 7/2003 | Kobayashi |
| 6,696,225 B1 | 2/2004 | Kanbe |
| 8,348,723 B2 | 1/2013 | Woo |
| 8,852,334 B1* | 10/2014 | Hills ............... C04B 28/02 106/600 |
| 2001/0041511 A1 | 11/2001 | Lack |
| 2002/0028288 A1 | 3/2002 | Rohrbaugh |
| 2002/0144712 A1 | 10/2002 | Barger |
| 2002/0158111 A1 | 10/2002 | Kelley |
| 2002/0170690 A1 | 11/2002 | Buchsel |
| 2003/0048538 A1 | 3/2003 | Tonar |
| 2004/0014865 A1 | 1/2004 | Keller |
| 2006/0275337 A1 | 12/2006 | Cohen Stuart |
| 2007/0051274 A1 | 3/2007 | Saito |
| 2007/0104922 A1 | 5/2007 | Zhai |
| 2007/0173179 A1 | 7/2007 | Guo |
| 2008/0199657 A1 | 8/2008 | Capron |
| 2008/0206545 A1 | 8/2008 | Chang |
| 2009/0176018 A1 | 7/2009 | Zou |
| 2009/0226648 A1 | 9/2009 | Wild |
| 2009/0304995 A1 | 12/2009 | Christenson |
| 2010/0035039 A1 | 2/2010 | Jing |
| 2010/0092765 A1* | 4/2010 | Hager ............... B82Y 30/00 428/331 |
| 2010/0203287 A1 | 8/2010 | Jiang |
| 2011/0014432 A1 | 1/2011 | Terada |
| 2011/0028305 A1 | 2/2011 | Lim |
| 2011/0033663 A1 | 2/2011 | Svec |
| 2011/0033694 A1 | 2/2011 | Jing |
| 2011/0076450 A1 | 3/2011 | Sharma |
| 2011/0143094 A1 | 6/2011 | Kitada |
| 2011/0287203 A1 | 11/2011 | Victor |
| 2011/0300345 A1 | 12/2011 | Bessonov |
| 2012/0276369 A1 | 11/2012 | Jing |
| 2013/0189911 A1* | 7/2013 | Manning ............... B24D 3/00 451/539 |

FOREIGN PATENT DOCUMENTS

| | | |
|---|---|---|
| CN | 102311234 | 1/2012 |
| GB | 1395979 | 5/1975 |
| GB | 2395450 | 5/2004 |
| JP | H04-255343 | 9/1992 |
| JP | H04-288349 | 10/1992 |
| JP | H05-286070 | 11/1993 |
| JP | H08-135031 | 5/1996 |
| JP | H09-204613 | 8/1997 |
| JP | H09-295363 | 11/1997 |
| JP | 2000-289134 | 10/2000 |
| JP | 2000-303663 | 10/2000 |
| JP | 2000-318083 | 11/2000 |
| JP | 2001-072893 | 3/2001 |
| KR | 2007-0000805 | 1/2007 |
| RU | 2 340 644 C2 | 12/2008 |
| RU | 2 430 897 C2 | 10/2011 |
| WO | WO 95/11773 | 5/1995 |
| WO | WO 02/051559 | 7/2002 |
| WO | WO 2009/045327 A1 | 4/2009 |
| WO | WO 2011/002838 | 1/2011 |
| WO | WO 2011/104928 | 9/2011 |
| WO | WO 2011/156670 | 12/2011 |
| WO | WO 2014/160578 | 10/2014 |

OTHER PUBLICATIONS

Kubiak, "Wettability versus roughness of engineering surfaces", Wear, 2011, vol. 271, pp. 523-528.
Manakasettharn, "Superhydrophobicity at Micron and Submicron Scale", Comprehensive Nanoscience and Technology, 2011, vol. 4, pp. 383-411.
Oh, "Wetting characteristic of ceramic to water and adhesive resin", Journal of Prosthetic Dentistry, 2002, vol. 88, No. 6, pp. 616-621.
International Search Report for PCT International Application No. PCT/US2014/035698, dated Feb. 9, 2015, 12 pgs.

* cited by examiner

EASY-CLEAN SURFACE AND METHOD OF MAKING THE SAME

TECHNICAL FIELD

The present disclosure broadly relates to easy-clean surfaces and methods of making them.

BACKGROUND

Various commercial products exist to help vehicle owners maintain the appearance and cleanliness of vehicle surfaces. Typical of such products are waxes, pastes, and sealants that claim to help protect the surface from environmental damage while providing a high gloss, slick appearance. Typically, such products provide hydrophobic surfaces (e.g., as in the case of carnauba wax, silicone waxes, and sealants) which often yield a water contact angle of about 90°. This effect is known as 'water beading'.

Upon drying, water beading leaves behind dirt residue in the form of spots caused by concentration of dirt or other contaminants present in the water. This problem gets worse when the water is especially dirty, for example, as found in slush, mud, or road spray.

The effect of surface roughness and porosity on wetting has been studied (see, for example, A. B. D. Cassie and S. Baxter, "Wettability of Porous Surfaces", *Trans. Faraday Soc.*, 1944, Vol. 40, pages 546-551). More recently, precision surface structuring has been studied in an effort to develop self cleaning "lotus effect" type surfaces; see, for example, K. J. Kubiak et al., "Wettability versus roughness of engineering surfaces", *Wear*, 2011, Vol. 271, pp. 523-528. However, large-scale production of such surfaces is not necessarily simple given that many of them are made via a process such as lithography, etching, or thin-film deposition that may not easily be transferred to complex curves found on vehicles.

Recent years have seen the introduction of various commercial products claiming to provide for 'water-sheeting' rather than 'water beading' behavior, which may reduce or eliminate water spots on drying. Water-sheeting results from the hydrophilic surface which can be effectively wet by water, thereby allowing water to drain from the surface. However, current products that provide long-lasting, durable water-sheeting surfaces typically have drawbacks such as unacceptably high levels of solvent needed to deposit them, or require cumbersome thermal curing or radiation curing.

Accordingly, there is a need for hydrophilic surface coatings and uncomplicated methods of making them that provide a durable, water-sheeting effect without requiring the use of high levels of solvent or cumbersome curing conditions in their preparation. Moreover, it is desirable that such surfaces are aesthetically acceptable in appearance.

SUMMARY

The present disclosure provides a method of making easy-clean and/or stay-clean surfaces, especially from water-beading surfaces. The method involves abrading the surface of the substrate until it achieves a specified roughness (e.g., $R_a$ in a range of from 10 nanometers (nm) to 3500 nm corresponding to a reduction in gloss and/or a matte appearance, and then applying a nanosilica-based coating composition treatment to the abraded surface.

Unexpectedly, nanosilica-based coatings disposed on abraded surfaces according to the present disclosure result in durable, water-sheeting, easy-clean and/or stay-clean surfaces (e.g., reduced dust accumulation, dirt accumulation, and/or retention of gloss). Further, methods according to the present disclosure can be easily used with three-dimensional substrates and/or in field locations where access to specialized equipment is limited, and can be practiced with little or no organic solvent. Advantageously, by using structured abrasive products the method can be practiced such that gouges and wild scratches can be avoided, resulting in an aesthetically desirable uniform appearance.

In one aspect, the present disclosure provides a method of providing an easy-clean, water-sheeting coating on a substrate, the method comprising steps:

a) abrading at least a portion of a surface of a substrate using an abrasive article to provide an abraded surface having a surface roughness $R_a$ in a range of from 10 nanometers (nm) to 3500 nm;

b) contacting a coatable composition with at least a portion of the abraded surface, wherein the coatable composition comprises silica particles, and wherein the silica particles have an average particle size of 100 nm or less; and c) at least partially removing water from the coatable composition to provide the easy-clean, water-sheeting coating on the substrate.

In another aspect, the present disclosure provides a kit comprising:

an abrasive article comprising abrasive particles secured to a backing by a binder; and a coatable composition comprising silica particles, and wherein the silica particles have an average particle size of 100 nm or less.

As used herein, the term "easy clean" means substantially cleanable by rinsing with soap and water alone, without the need for washing implements such as sponges, wipers, cloths, and or brushes.

As used herein, the term "$R_a$" refers to average surface roughness, and is defined as the integral of the absolute value of the distance from the mean elevation. The mean elevation is the arithmetic average of the height profile. The function z(x) refers to the difference between the height and the mean elevation at a position x measured over an evaluation length l:

$$R_a = \frac{1}{l}\int_0^l |z(x)|dx$$

As used herein, the term "$R_q$" represents the root mean square value of the ordinate values z(x) within the sampling length l $$R_q = \sqrt{\frac{1}{l}\int_0^l z^2(x)dx}$$

As used herein, the term "$R_{sk}$" refers to the quotient of the mean cube value of the ordinate values z(x) and the cube of $R_q$ within the sampling length l.

$$R_{sk} = \frac{1}{R_q^3}\left[\frac{1}{l}\int_0^l z^3(x)dx\right]$$

It should be understood that numerous other modifications and embodiments can be devised by those skilled in the art, which fall within the scope and spirit of the principles of the disclosure. The figures may not be drawn to scale.

DETAILED DESCRIPTION

Figure 1:
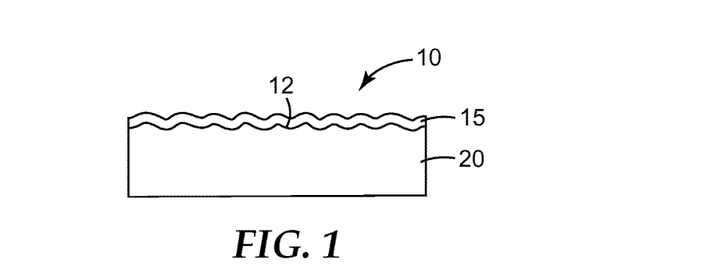
FIG. 1 is a schematic drawing of an exemplary substrate having an easy-clean, water-sheeting surface coating thereon made according to the present disclosure.

According to the present disclosure, a surface of a substrate can be modified into an easy-clean water-sheeting surface by a method comprising the steps of: abrading at least a portion of a surface of a substrate using an abrasive article to provide an abraded surface having a surface roughness $R_a$ in a range of from 10 nm to 3500 nm; and contacting a coatable composition with at least a portion of the abraded surface. FIG. 1 shows an exemplary such modified substrate 10. Referring to FIG. 1, easy-clean, water-sheeting surface coating 15 is disposed on abraded surface 12 of substrate 20.

Preferably, the surface of the substrate is clean before beginning the abrading step, but this is not a requirement. For example, the abrading process itself may remove dirt and stains from the surface during abrading. If a separate cleaning step is desired, it can be performed, for example, by washing the surface with a soap or detergent and water, thoroughly rinsing any residual soap from the surface with water, and optionally wiping dry or allowing the surface to air dry.

Abrading may be carried out using any abrasive article capable for achieving the desired surface roughness (i.e., a surface roughness average $R_a$ in a range of from 10 nm to 3500 nm, preferably in a range of from 100 nm to 1000 nm, and more preferably in a range of from 200 nm to 600 nm). Surfaces having the desired $R_a$ roughness typically have a low gloss (especially 20° gloss) and/or matte appearance. $R_a$ can be measured, for example, using commercially available profilometers such as, for example, a WYKO NT3300 optical profilometer from Veeco Instruments Inc., Plainview, N.J.

Preferably, the surface roughness and/or appearance of the abraded surface is substantially uniform (e.g., free of wild scratches and gouges that are visible to the unaided human eye) over at least that portion of the substrate surface that is to be coated with the coatable composition.

Suitable substrates for practicing the present disclosure include, for example, plastic substrates, metallic substrates, painted substrates, ceramic substrates, and fiberglass substrates. The substrate may comprise glass or transparent plastic, but it will be recognized that any transparent substrate that is abraded according to the present may lose transparency. Examples of suitable substrates include vehicles (e.g., buses, trucks, cars, rail cars, locomotives, vans, trolleys, motor homes, airplanes, bicycles, boats, and barges), bridges, exterior architectural panels, showers, bathtubs, trailers, signs (e.g., traffic signs, advertising signs, neon signs), substrates with polymeric clearcoats, and outdoor furniture (e.g., plastic or metal chairs and tables). The present disclosure may be effectively practiced on surfaces that are painted (e.g., interior and/or exterior walls) and/or have a polymeric clearcoat thereon, especially if the surface already has a matte appearance before the abrading step.

The abrasive article may be any abrasive article capable of abrading the surface of the substrate and achieving a surface roughness $R_a$ in the range of from 10 nm to 3500 nm. Examples include sandpaper, nonwoven abrasives, structured abrasive articles, and/or rubbing compounds. Structured abrasive articles generally comprise shaped abrasive composites secured to a backing. The shaped abrasive composites comprise abrasive particles retained in a binder material (commonly known as a binder). The shaped abrasive composites may have any intended shape and may be formed from a curable slurry of a binder precursor and the abrasive particles by a process such as, for example, screen printing, embossing, or coating into cavities of a production tool and then curing the binder precursor.

During the production of an abrasive article, the binder precursor is exposed to the appropriate conditions (i.e., heat, ultraviolet radiation, visible radiation, or electron beam) to convert the binder precursor to a solid binder. Typically, conversion of a binder precursor to a solid (e.g., thermoset) binder is the result of a curing process, such as polymerization and/or crosslinking.

The binder precursor is preferably capable of being cured by radiation energy or thermal energy. Sources of radiation energy include electron beam energy, ultraviolet light, visible light, and laser light. If ultraviolet or visible light is utilized, a photoinitiator is preferably included in the mixture. Upon being exposed to ultraviolet or visible light, the photoinitiator generates a free radical source or a cationic source. This free radical source or cationic source initiates the polymerization of the binder precursor. A photoinitiator is optional when a source of electron beam energy is utilized.

Examples of binder precursors that are capable of being cured by radiation energy include (meth)acrylated urethanes, (meth)acrylated epoxies, ethylenically-unsaturated compounds, aminoplast derivatives having one or more pendant (meth)acryl groups (i.e., wherein $R^5$ is hydrogen or methyl), isocyanurate derivatives having at least one pendant (meth)acryl group, isocyanate derivatives having at least one pendant (meth)acryl group, vinyl ethers, epoxy resins, and combinations thereof. The term (meth)acrylate refers to acrylates and/or methacrylates. Appropriate free-radical photoinitiator(s) and/or cationic photocatalyst(s) is/are typically used in conjunction with radiation-curable binder precursors. Selection of appropriate compounds will depend on the binder precursor(s) chosen, and are well known in the art.

Examples of suitable binder precursors include polyisocyanates, two-part urethanes, epoxy resins, cyanate resins, ethylenically-unsaturated compounds (e.g., polyfunctional acrylates and methacrylates), vinyl ethers, aminoplast resins, phenolic resins, and combinations thereof.

Examples of suitable abrasive particles include particles comprising materials such as fused aluminum oxide, ceramic aluminum oxide, white fused aluminum oxide, heat treated aluminum oxide, silica, silicon carbide, green silicon carbide, alumina zirconia, diamond, ceria, cubic boron nitride, garnet, tripoli, and combinations thereof. Ceramic aluminum oxide is preferably made according to a sol-gel process, such as reported in U.S. Pat. No. 4,314,827 (Leitheiser); U.S. Pat. No. 4,623,364 (Cottringer et al.); U.S. Pat. No. 4,744,802 (Schwabel et al.); U.S. Pat. No. 4,770,671 (Monroe et al.); U.S. Pat. No. 4,881,951 (Monroe et al.); U.S. Pat. No. 5,011,508 (Wald et al.); and U.S. Pat. No. 5,213,591 (Celikkaya et al.).

Ceramic aluminum oxide abrasive particles comprise alpha alumina and, optionally, a metal oxide modifier, such as magnesia, zirconia, zinc oxide, nickel oxide, hafnia, yttria, silica, iron oxide, titania, lanthanum oxide, ceria, neodymium oxide, and combinations thereof. The ceramic aluminum oxide may also optionally comprise a nucleating agent, such as alpha alumina, iron oxide, iron oxide precursor, titania, chromia, or combinations thereof. Ceramic abrasive particles may also include a surface coating, for example, as is known in the art. A surface coating can improve the adhesion between the abrasive particles and the binder and/or can alter the abrading characteristics of the abrasive particles. Such surface coatings are reported in U.S. Pat. No. 1,910,444 (Nicholson); U.S. Pat. No. 3,041,156 (Rowse et al.); U.S. Pat. No. 4,997,461 (Markhoff et al.); U.S. Pat. No. 5,009,675 (Kunz et al.); U.S. Pat. No. 5,011,508 (Wald et al.); U.S. Pat. No. 5,042,991 (Kunz); and U.S. Pat. No. 5,213,591 (Celikkaya et al.). Abrasive particles may also contain a coupling agent on their surface, such as a silane coupling agent.

The binder may contain a single type of abrasive particle, two or more types of different abrasive particles, or at least one type of abrasive particle with at least one type of diluent material. Examples of materials for diluents include calcium carbonate, glass bubbles, glass beads, greystone, marble, gypsum, clay, $SiO_2$, $KBF_4$, $Na_2SiF_6$, cryolite, organic bubbles, and organic beads.

For use in the present disclosure, the abrasive particles, taken as a whole, preferably have a median particle diameter (i.e., $D_{50}$) in the range of from about 1 micron to 202 microns, more preferably from 3 microns to 75 microns, and even more preferably from 6 microns to 26 microns, although other particle sizes may also be used. Exemplary abrasive particles include those having a FEPA (Federation of European Producers of Abrasives) specified nominal grade of from P80 to P2500, inclusive. These include, for example, FEPA P grades P80, P150, P180, P220, P240, P280, P320, P360, P400, P500, P600, P800, P1000, P1200, P1500, P2000, and P2500; JIS (Japanese Industrial Standard) grades designations JIS60, JIS80, JIS100, JI5150, JIS180, JI5220, JI5240, JI5280, JI5320, JI5360, JI5400, JI5600, JI5800, JIS1000, JIS1500, JIS2500, JIS4000, JIS6000, and JIS8000; and combinations thereof.

The backing can be any conventional abrasive backing Examples of useful backings include polymeric film, primed polymeric film, cloth, paper, nonwovens (e.g., spunbond, spunlaced, or melt spun), and combinations thereof. Preferably, the backing is flexible.

The backing may also have an attachment means on its back surface to enable securing the resulting coated abrasive to a support pad or back-up pad. The attachment means can be a pressure-sensitive adhesive, one surface of a hook and loop attachment system, or threaded projections as reported in U.S. Pat. No. 5,316,812 (Stout et al.). Alternatively, there may be an intermeshing attachment system as reported in U.S. Pat. No. 5,201,101 (Rouser et al.).

Figure 2:
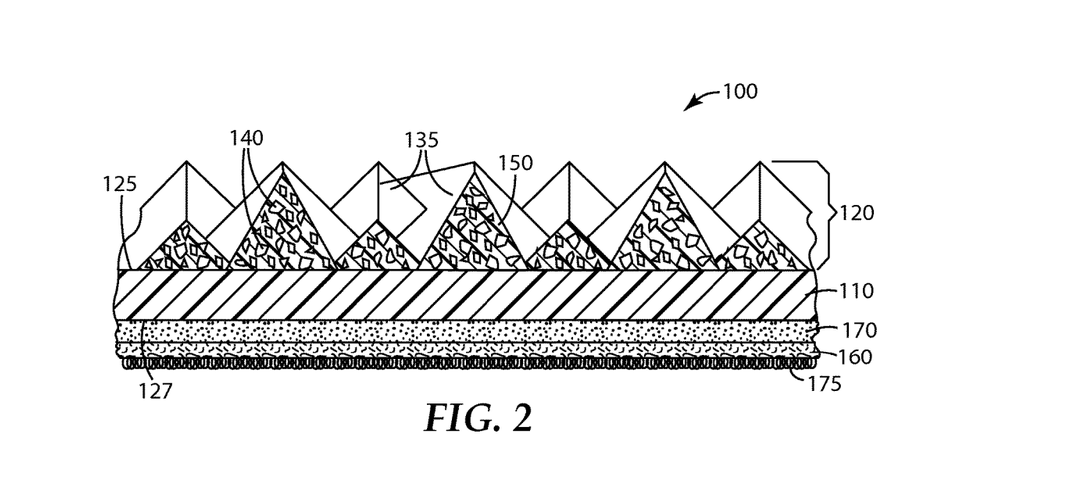
FIG. 2 is a schematic side view of an abrasive article useful for practicing the method of the present disclosure.

FIG. 2 shows an exemplary structured abrasive article useful for practicing the present disclosure. Referring now to FIG. 2, exemplary structured abrasive article 100, useful in practice of the present disclosure has abrasive layer 120 comprising shaped abrasive composites 135 disposed on and secured to a first major surface 125 of backing 110. Shaped abrasive composites 135 comprise abrasive grains 140 dispersed in binder 150. Optional attachment layer interface 160 is disposed on second major surface 127 of backing 110, and includes optional pressure-sensitive adhesive layer 170 and optional looped fabric 175. Optional looped fabric 175 may be bonded to second major surface 127 by optional pressure-sensitive adhesive layer, if present, or through other direct contact bonding methods (e.g., heat lamination, stitchbonding, ultrasonic welding).

Useful structured abrasive articles may have the form of a sheet, disc, or belt, for example. Preferably, the structured abrasive article itself or a backup pad to which it is mounted includes a resilient conformable material such as, for example, a foam that permits the abrading surface to follow contours of the surface of the substrate, although this is not a requirement. The structured abrasive article may be driven by hand or by machine (e.g., a rotary disc sander or a belt sander).

Optionally, a liquid and/or lubricant may be used during abrading to facilitate the abrading process. Examples include oils, water, and detergent solutions.

Suitable abrasive articles for practicing the present disclosure are commercially available; for example, from 3M Company, Saint Paul, Minn. under the trade designation TRIZACT. Examples include TRIZACT HOOKIT foam backed discs, available in abrasive grit sizes P5000, P3000, and P1000.

Further details concerning structured abrasive articles having precisely-shaped abrasive composites, and methods for their manufacture may be found, for example, in U.S. Pat. No. 5,152,917 (Pieper et al.); U.S. Pat. No. 5,435,816 (Spurgeon et al.); U.S. Pat. No. 5,672,097 (Hoopman); U.S. Pat. No. 5,681,217 (Hoopman et al.); U.S. Pat. No. 5,454,844 (Hibbard et al.); U.S. Pat. No. 5,851,247 (Stoetzel et al.); and U.S. Pat. No. 6,139,594 (Kincaid et al.); and U.S. Pat. No. 8,348,723 (Woo et al.). Further details concerning screen-coated structured abrasive articles may be found, for example, in U.S. Pat. Appl. Publ. No. 2001/0041511 (Lack et al.). General processes for preparing such embossed structured abrasive articles are described in, for example, U.S. Pat. No. 5,833,724 (Wei et al.); U.S. Pat. No. 5,863,306 (Wei et al.); U.S. Pat. No. 5,908,476 (Nishio et al.); U.S. Pat. No. 6,048,375 (Yang et al.); U.S. Pat. No. 6,293,980 (Wei et al.); and U.S. Pat. Appl. Publ. No. 2001/0041511 (Lack et al.).

The degree of abrading may be determined using a roughness tester according to methods well known in the art, however it is generally possible to achieve the desired surface roughness by abrading with structured abrasive articles as described herein until a low gloss finish is obtained, preferably a uniform matte finish is obtained. Once the surface of the substrate has been abraded to provide the correct surface roughness, the coatable composition is coated onto the abraded surface. Useful coating methods include, for example, spraying, dipping, and wiping with an applicator (e.g., a sponge or cloth).

In some embodiments, the coatable composition may be present at the surface as it is being abraded, although more typically coating will take place as a separate step.

Abraded surfaces with random or pseudo-random swirl marks tend to be more aesthetically pleasing than non-random patterns to the human eye. Accordingly, the abrading method is preferably selected such that a random or pseudo-random pattern of abrasions is obtained. Examples of useful devices for generating random or pseudorandom swirl patterns include random orbital sanders.

In some embodiments, the coatable composition can be prepared by combining components comprising an aqueous dispersion comprising silica nanoparticles, an alkoxysilane oligomer, and a silane coupling agent. In some embodiments, the coating composition is preparable from components comprising an aqueous dispersion having a pH of less than 7.5 (preferably less than 5, more preferably less than 4), of silica nanoparticles having average particle diameters of 40 nanometers or less; an alkoxysilane oligomer; a silane coupling agent, and optionally a metal β-dicarbonyl complexing agent. In some embodiments, the coating composition comprises a reaction product of the alkoxysilane oligomer and the silane coupling agent.

Although the coating compositions of the present invention may be readily prepared and applied at any pH value below about 7.5, it has been found that coating compositions of lower pH, particularly below a pH of about 5, preferably below a pH of about 4, and more preferably below a pH of about 3.5 can wet out and spread onto hydrophobic substrate surfaces. If acidified, the coating composition is preferably acidified with an acid having a $pK_a$ of less than 5, preferably less than 2.5, most preferably less than 1. The coating formulations, which are substantially water-based, exhibit improved stability during storage.

The silica particles (e.g., silica nanoparticles) used in the coatable composition are dispersions of submicron size silica nanoparticles in an aqueous or aqueous/organic solvent mixtures. The silica nanoparticles may have an average particle diameter (i.e., a distribution average particle diameter) of 100 nanometers or less, 90 nanometers or less, 80 nanometers or less, 70 nanometers or less, 60 nanometers or less, 50 nanometers or less, 40 nanometers or less, 30 nanometers or less, 20 nanometers or less, or even 10 nanometers or less. The average particle size may be determined, for example, using transmission electron microscopy.

Useful silica nanoparticles typically have a surface area greater than about 150 square meters per gram ($m^2/g$), preferably greater than 200 $m^2/g$, and more preferably greater than 400 $m^2/g$. The particles preferably have narrow particle size distributions, for example, a polydispersity of 2.0 or less, preferably 1.5 or less.

Silica nanoparticles in aqueous media (sols) are well known in the art and available commercially. Silica sols in water or aqueous alcohol solutions are available commercially under such trade designations as "LUDOX" (e.g., LUDOX SM silica sol) from E. I. du Pont de Nemours and Co., Inc., Wilmington, Del.; "NYACOL" from Nyacol Co., Ashland, Mass.; "NALCO" (e.g., NALCO 1115, NALCO 1130, and NALCO 2326 silica sols) from Nalco Chemical Co., Naperville, Ill.; and "REMASIL" (e.g., REMASOL SP30 silica sol) commercially available from Remet Corp., Utica, N.Y.

Non-aqueous silica sols (also called silica organosols) may also be used and are silica sol dispersions wherein the liquid phase is contains aqueous organic solvent. In the practice of this disclosure, the silica sol is chosen so that its liquid phase is compatible with the aqueous or an aqueous organic solvent. However, it has been observed that sodium-stabilized silica nanoparticles should first be acidified prior to dilution with an organic solvent such as ethanol. Dilution prior to acidification may yield poor or non-uniform coatings. Ammonium-stabilized silica nanoparticles may generally be diluted and acidified in any order.

If desired, larger silica particles may be added, preferably in an amount that does not deleteriously affect the hydrophilicity of the abraded surface. Such coatings would have a bi- or multi-modal distribution of silica particle size. These additional silica particles generally have an average particle size of greater than 40 to 100 nanometers, preferably 50 to 100 nanometers, and may be used in ratios of 0.2:99.8 to 99.8:0.2, relative to the weight of the silica nanoparticles of less than 40 nanometers. Larger particles are preferably used in ratios of 1:9 to 9:1. Generally the total weight of silica particles in the composition is between about 30 to 95 percent by weight, preferably 50 to 75 percent by weight based on total solids.

In some embodiments, the silica nanoparticles may be surface-modified using a surface-modifying agent. A surface-modified silica particle includes surface groups attached to the surface of the particle. The surface groups modify the hydrophobic or hydrophilic nature of the particle, but are preferably hydrophilic. The surface groups may be selected to provide a statistically averaged, randomly surface-modified particle. In some embodiments, the surface groups are present in an amount sufficient to form a monolayer, preferably a continuous monolayer, on the surface of the particle. Generally, less than complete modification of the available surface functional groups (i.e., silanol groups) is desirable so as to allow bonding of the nanoparticles to the silicate matrix via the residual unmodified silanol surface groups.

A variety of methods are available for modifying the surface of nanoparticles including, e.g., adding a surface-modifying agent to nanoparticles (e.g., in the form of a powder or a colloidal dispersion) and allowing the surface-modifying agent to react with the nanoparticles. Other useful surface-modification processes are described in, e.g., U.S. Pat. No. 2,801,185 (Iler) and U.S. Pat. No. 4,522,958 (Das et al.). Surface-modifying groups may be derived from surface-modifying agents. Schematically, surface-modifying agents can be represented by the formula A-B, where the A group is capable of attaching to the surface of the particle (i.e., the silanol groups) and the B group is a compatibilizing group that does not react with other components in the system (e.g., the substrate). Compatibilizing groups can be selected to render the particle relatively more polar, relatively less polar or relatively non-polar. Preferably, the compatibilizing group is a non-basic hydrophilic group such as an acid group (including —$CO_2H$, —$SO_3H$, and —$PO_3H$ groups), poly(oxyethylene) group, or hydroxyl group.

Such optional surface-modifying agents may be used in amounts such that 0 to 100%, generally 1 to 90% (if present) of the surface functional groups (Si—OH groups) of the silica nanoparticles are functionalized. The number of functional groups is experimentally determined where quantities of nanoparticles are reacted with an excess of surface modifying agent so that all available reactive sites are functionalized with a surface modifying agent. Lower percentages of functionalization may then be calculated from the result. Generally, the amount of surface modifying agent is used in amount sufficient to provide up to twice the equal weight of surface modifying agent relative to the weight of inorganic nanoparticles. If used, the weight ratio of surface modifying agent to inorganic nanoparticles is preferably 2:1 to 1:10. If surface-modified silica nanoparticles are desired, it is preferred to modify the nanoparticles prior to incorporation into the coating composition.

In some embodiments, the coatable composition may contain less than 10 percent by weight, less than 5 percent by weight, less than 1 percent by weight, less than 0.1 percent by weight, less than 0.01 percent by weight, or even be free of titanium dioxide and/or precursors thereof. This may be particularly useful as films containing titanium dioxide may tend to discolor over time.

The coating composition may be acidified to the desired pH level with an acid having a $pK_a$ ($H_2O$) of <5, preferably less than 2.5, most preferably less than 1. Useful acids include both organic and inorganic acids and may be exemplified by oxalic acid, citric acid, benzoic acid, acetic acid, formic acid, propanoic acid, benzenesulfonic acid, $H_2SO_3$, $H_3PO_4$, $CF_3CO_2H$, HCl, HBr, HI, $HBrO_3$, $HNO_3$, $H_2SO_4$, $CH_3SO_3H$, $CF_3SO_3H$, and $CF_3CO_2H$. Preferred acids include HCl, $HNO_3$, $H_2SO_4$, $H_3PO_4$, and combinations thereof. In some embodiments, it may be desirable to provide a mixture of an organic and inorganic acid. In some embodiments, one may use a mixture of acids comprising those having a $pK_a \leq 5$ (preferably <2.5, most preferably less than 1) and minor amounts of other acids having $pK_a s > 5$. It has been found that using weaker acids having a $pK_a$ of $\geq 5$ may not provide a uniform coating having the desirable properties which may include transmissivity, cleanability and/or durability. In particular, coating compositions containing weaker acids, or basic coating compositions, typically bead up on the surface of a polymeric substrate.

In many embodiments, the coating composition generally contains sufficient acid to provide a pH of less than 5, preferably less than 4, most preferably less than 3. In some embodiments, it has been found that the pH of the coating composition can be adjusted to a pH in the range of from about 5 to about 7.5 after reducing the pH to less than 5. This allows one to coat materials which are sensitive to low pH.

The coating composition may further comprise alkoxysilane oligomer (i.e., one or more alkoxysilane oligomers). Useful alkoxysilane oligomers are the fully- or partially-hydrolyzed condensation reaction product of one or more tetralkoxysilanes and optionally one or more trialkoxysilanes and optionally one or more dialkoxysilanes. Alkoxysilane oligomers may be a complex mixture of linear and branched products. Useful alkoxysilane oligomers may also be represented by the unit cell of the formula $Si(O)_o(OR^1)_p$, where each $R^1$ is individually H or an alkyl group having from 1 to 4 carbon atoms, o is greater than zero and less than 1.2, and p is greater than 1.4 and less than 4.

In some embodiments, useful alkoxysilane oligomers may be represented by Formula 1 (below):

FORMULA 1 wherein:
each $R^1$ is independently H, or a $C_1$ to $C_4$ alkyl group, an alkali metal, and alkali earth metal or ammonium;
each $R^2$ is independently a $C_1$ to $C_4$ alkyl group;
x is and integer from 2 to 100 (preferably from 3 to 15), inclusive; and
y and z are independently integers greater than or equal to zero, wherein x is greater than y+z, and wherein x+y+z is in the range of from 2 to 100 (preferably 3 to 15), inclusive.

Formula 1 (above) is intended to show stoichiometry, but not imply a block polymer structure. Useful alkoxysilane oligomers of Formula I may generally be prepared by hydrolytic condensation of the tetralkoxysilanes and optionally one or more trialkoxysilanes and/or dialkoxysilanes. Useful methods are described in U.S. Pat. Appl. Publ. No. 2007/0051274 (Saito et al.), and U.S. Pat. No. 6,258,969 (Sawai et al.) and U.S. Pat. No. 6,599,976 (Kobayashi et al.).

Suitable oligomeric alkoxysilanes are also commercially available as MKC SILICATE MS51 and MKC SILICATE MS56, the partial hydrolysis/condensation products of tetramethoxysilane; MKC SILICATE BTS, the partial hydrolysis/condensation product of tetrabutoxysilane from Mitsubishi Chemical Corporation, Tokyo, Japan; and ETHYL SILICATE ES40, the partial hydrolysis/condensation product of tetraethoxysilane, from Colcoat Co., Ltd, Tokyo, Japan. It will be understood by those skilled in the art that the exact nature of the oligomer, including its repeating unit characteristics and molecular weight, is not limited to the commercial examples cited here, but may be varied substantially without departing from the scope of the present disclosure. For example, higher or lower molecular weight oligomeric alkoxysilanes may allow improvements in coating on surfaces having varying texture or surface energy, the precise oligomers chosen to optimize performance in application and dried coating characteristics.

Oligomeric alkoxysilanes are typically added to the coating composition at levels of from 1 to 55 percent by weight of the dried coating composition, preferably from about 10 to 45 percent by weight of the dried coating composition, although other amounts may also be used.

The coating composition may further comprise silane coupling agent (i.e., one or more silane coupling agents). In preferred embodiments, the silane coupling agent is represented by Formula 2 (below):

$$[(Y)_c—R^3]_d—Si—(OR^4)_b(R^4)_{(4-b-d)}$$  FORMULA 2 wherein:
Y comprises a monvalent organic residue comprising at least one of an epoxy group, an acid group, a hydroxyl group, a mercapto group, an alkyl group having from 1 to 18 carbon atoms, an aryl group having from 6 to 14 carbon atoms, or a free-radically polymerizable ethylenically-unsaturated group;
$R^3$ is a covalent bond or a di- or trivalent hydrocarbon bridging group;
$R^4$ is independently an alkyl, aryl, or aralkyl group of 1 to 8 carbon atoms optionally substituted in available positions by oxygen, nitrogen and/or sulfur atoms;
b is 1, 2, or 3;
c is 1 or 2; and
d is 1 or 2, wherein (b+d)≤4.
Preferably, b is 3, c is 1, and d is 1.
Preferably, $R^3$ is a covalent bond, or a di- or trivalent hydrocarbon bridging group of about 1 to 20 carbon atoms, optionally including in the backbone up to 5 moieties selected from the group consisting of —O—, —C(=O), —S—, —$SO_2$— and —$NR^2$— groups (and combinations thereof such as, for example, —C(=O)—O—), wherein $R^2$ is hydrogen or an alkyl group having from 1 to 4 carbon atoms.

In another embodiment, $R^3$ is a poly(alkylene oxide) moiety represented by the formula —($OCH_2CH_2$)$_n$($OCH_2CH(R^1)$)$_m$—, wherein n is an integer greater than or equal to 5, m is an integer greater than or equal to 0 (preferably greater than or equal to 1), and the mole ratio of n:m is at least 2:1 (preferably at least 3:1). In Formula 2, it will be understood that when c is 1, then $R^3$ is a covalent bond or a divalent hydrocarbon bridging groups, and when c is 2, then $R^3$ is a trivalent bridging group. Preferably, $R^3$ is a divalent alkylene group and c is 1. Preferably, $R^4$ is an alkyl group having from 1 to 4 carbon atoms; and b is 1 to 3.

In some embodiments, Y is a non-basic organic functional group $Y^1$, which may be selected from an epoxy group (including glycidyl), an acid group, an ester group, a hydroxyl group, and a sulfhydryl group. Useful epoxy-functional silane coupling agents include 2-(3,4-epoxycyclohexyl)ethyltriethoxysilane, 2-(3,4-epoxycyclohexyl)ethyltrimethoxysilane, 5,6-epoxyhexyltriethoxysilane, (3-glycidoxypropyl)triethoxysilane, β-glycidoxypropyl) trimethoxysilane), and combinations thereof. Useful mercapto-functional silane coupling agents include 3-mercaptopropyltrimethoxysilane and 3-mercaptopropyltriethoxysilane.

In another embodiment, Y is an ethylenically unsaturated group $Y^2$, which may be selected from ethylenically unsaturated polymerizable groups, including vinyl, allyl, vinyloxy, allyloxy, and (meth)acryloxy. Silane coupling agents with ethylenically unsaturated groups includes organosilanes such as, for example, 3-(methacryloxy)propyltrimethoxysilane, 3-acryloxypropyltrimethoxysilane, 3-(methacryloxy) propyltriethoxysilane, 3-(methacryloxy)propylmethyldimethoxysilane, 3-(acryloxypropyl)methyldimethoxysilane, 3-(methacryloxy)propyldimethylethoxysilane, 3-(methacryloxy)propyldiethylethoxysilane, vinyldimethylethoxysilane, vinylmethyldiethoxysilane, vinyltriacetoxysilane, vinyltriethoxysilane, vinyltriisopropoxysilane, vinyltrimethoxysilane, vinyltriphenoxysilane, tris(t-butoxy)vinylsilane, vinyltris(isobutoxy)silane, vinyltriisopropenoxysilane, vinyltris (2-methoxyethoxy)silane, and mixtures thereof. Preferably, $Y^2$ is vinyl, allyl, vinyloxy, or allyloxy.

In another embodiment, Y is a non-functional hydrocarbyl group $Y^3$ selected from alkyl groups an aryl groups. Useful non-functional silane coupling agents include methyltrimethoxysilane, methyltriethoxysilane, methyltripropoxysilane, methyltriisopropoxysilane, ethyl trimethoxysilane, ethyltriethoxysilane, ethyltripropoxysilane, ethyltriisopropoxysilane, propyl trimethoxysilane, propyltriethoxysilane, butyltrimethoxysilane, butyltriethoxysilane, pentyl trimethoxysilane, pentyltriethoxysilane, hexyltrimethoxysilane, hexyltriethoxysilane, phenyltrimethoxysilane, phenyltriethoxysilane, phenyltripropoxysilane, phenyltriisopropoxysilane, benzyltrimethoxysilane, and benzyltriethoxysilane.

Silane coupling agents may be made, for example, by conventional techniques, or they may be purchased from commercial suppliers such as, for example, Gelest, Inc., Morrisville, Pa.; Momentive Performance Materials, Wilton, Conn.; and United Chemical Technologies, Inc., Horsham, Pa. Further reference may be made to U.S. Pat. No. 5,204,219 (Van Ooij et al.); U.S. Pat. No. 5,464,900 (Stofko et al.); and U.S. Pat. No. 5,639,546 (Bilkadi).

The amount of silane coupling agent is typically in a range of 0.25 to 35 weight percent, preferably 10 to 30 weight percent, based on total added solids of the coating composition, although other amounts are allowed.

The coating composition may optionally further comprise one or more metal β-diketone complexing agents having a metal and a 1,3-dioxopropylene group. The β-diketone complexing agent may function as a hydrolysis catalyst in the formation of bonds between one or more of the silica nanoparticles, the alkoxy silane oligomer and the silane coupling agent, and may promote deprotonation of the silanol groups thereby enhancing linear polycondensation. Additionally, the β-diketone complexing agent retards gelation thereby promoting stability of the coating compositions and enhancing shelf-life prior to coating.

The type of the metal in the complexing agent is not particularly limited. Metals having great constants of complex formation with β-diketone ligands are preferably used. Examples of such metal complexing agents include metal chelate compounds of β-diketones such as tris(acetylacetonato)aluminum(III), tris(ethyl acetylacetato)aluminum(III), tris(diethylmalonato)aluminum(III), bis(acetylacetonato) copper(II), tetrakis(acetylacetonato)zirconium(IV), tris (acetylacetonato)chromium(III), tris(acetylacetonato)cobalt (III) and titanium(IV) oxoacetylacetonate $[(CH_3COCHCOCH_3)_2TiO]$; and metal chelate compounds of β-diketones with rare earth metals. Preferably, the β-diketone complexing is selected from aluminum β-diketone complexing agent, more preferably aluminum acetylacetonates.

The β-diketone complexing agents may be used alone or in combinations of any two or more thereof. The amount of complexing agent added is preferably 0 to 10 weight percent, more preferably 0.1 to 10 weight percent, and even more preferably between about 0.1 and 5 weight percent, based on total added solids of the coating composition.

To permit easy coating, the surface tension of the coating composition may be decreased by addition of lower molecular weight alcohols, especially alcohols having from 1 to 8 carbon atoms. However, in some instances, in order to improve the coating hydrophilicity for desired properties and to ensure uniform coating of the article from an aqueous or hydroalcoholic solution, it may be beneficial to add a wetting agent, which is typically a surfactant. Use of wetting agents generally is not desirable, because such agents are thought to reduce adhesion of the coatings to the substrate, thereby reducing durability, and in addition to cause streaks and haze in the dried coatings.

The term "surfactant" as used herein describes molecules comprising hydrophilic (polar) and hydrophobic (non-polar) segments on the same molecule which are capable of reducing the surface tension of the coating solution. Useful surfactants may also include those disclosed in U.S. Pat. No. 6,040,053 (Scholz et al.).

For typical concentrations of silica nanoparticles (e.g., about 0.2 to 15 percent by weight relative to the total coating composition) most surfactants comprise less than about 0.1 percent by weight of the coating composition, preferably between about 0.003 and 0.05 percent by weight, in order to preserve the anti-reflective properties of the coating. It should be noted that with some surfactants a spotty coating is attained at concentrations in excess of what is needed to achieve the desired properties. In particular, it has been observed that surfactants may reduce the durability of the resultant coatings. Preferably, the coating composition contains no surfactants or wetting agents.

Anionic surfactants in the coating composition are preferred when added to improve the uniformity of the resulting coatings. Useful anionic surfactants include, for example, those with molecular structures comprising (1) at least one hydrophobic moiety such as alkyl, alkylaryl, and/or alkenyl groups having from 6 to 20 carbon atoms, (2) at least one anionic moiety, such as sulfate, sulfonate, phosphate, polyoxyethylene sulfate, polyoxyethylene sulfonate, polyoxyethylene phosphate, and the like, and/or (3) the salts of such anionic groups, wherein said salts include alkali metal salts, ammonium salts, and tertiary amino salts. Exemplary useful anionic surfactants include sodium lauryl sulfate, sodium lauryl ether sulfate, ammonium lauryl sulfate, and sodium dodecylbenzenesulfonate.

Where the coating composition does not include a surfactant, or when improved coating uniformity is desirable, it may be beneficial to add another wetting agent, including those that do not impart durable anti-fog properties, in order to ensure uniform coating of the article from an aqueous or hydroalcoholic solution. Examples of useful wetting agents include polyethoxylated alkyl alcohols, polyethoxylated alkylphenols. Generally, if used the wetting agent is present in amounts of less than about 0.1 percent by weight of the coating composition, preferably between about 0.003 and 0.05 percent by weight of the coating composition depending on the amount of silica nanoparticles.

Preferably, the pH of the coating solution is less than about 4, but greater than about 1, but this is not a requirement. For example, the pH of the coatable composition may be in the range of from 2 to 4 or even 3 to 4.

The components of the coatable composition may be present in any amount, but are preferably present is the following amounts. In some embodiments, the coatable composition comprises, on a solids weight basis, from 30 to 95 percent of the silica nanoparticles, from 1 to 55 percent of the alkoxysilane oligomer, from 0.25 to 35 percent of the silane coupling agent, and optionally from 0.1 to 10 percent of the metal β-diketone complexing agent.

Details concerning acicular silica coatings suitable for use in (or as) the above-described coating composition are described, for example, in U.S. Pat. Appln. Publ. No. 2010/0035039 A1 (Jing et al.).

In some embodiments, the coatable composition comprises water, silica nanoparticles having a mean particle diameter of 40 nanometers or less dispersed in the water, and an acid having a $pK_a$ of <3.5 in an amount effective to produce a pH of less than 5. Further details concerning aqueous coating compositions suitable for use in (or as) the coating composition are described, for example, in U.S. Pat. Appln. Publ. No. 2012/0276369 A1 (Jing et al.)

In some embodiments, based on the total weight of components a) to e), the coatable composition comprises:
a) 0.5 to 99 weight percent of water;
b) 0.1 to 20 weight percent of silica nanoparticles having an average particle diameter of 40 nm or less;
c) 0 to 20 weight percent of silica nanoparticles having an average particle diameter of 50 nm or more, wherein the sum of b) and c) is 0.1 to 20 weight percent;
d) a sufficient amount of an acid having a $pK_a$ of <3.5 to reduce the pH to less than 5; and
e) 0 to 20 percent by weight of a tetraalkoxysilane, relative to the sum of b) and c).

Further details concerning coating compositions suitable for use in (or as) the coating composition are described, for example, in U.S. Pat. Appln. Publ. No. 2011/0033694 A1 (Jing et al.).

In some embodiments, the coatable composition comprises: a) an aqueous dispersion, having a pH of less than 7.5 of silica nanoparticles having average particle diameters of 40 nanometers or less, b) an alkoxysilane oligomer; c) a silane coupling agent, and d) optionally a metal beta-diketone complexing agent. Further details concerning coating compositions suitable for use in (or as) the coating composition are described, for example, in U.S. Pat. Appln. Publ. No. 2010/0092765 A1 (Hager et al.).

Although water will be present in the coatable composition, due at least in part to the aqueous dispersion comprising silica nanoparticles, it may be desirable to include one or more water-soluble and/or water-miscible nonreactive volatile organic solvents (VOCs) to facilitate coating and/or drying, although preferably, the coating composition contains less than 15 percent, less than 10 percent, less than 5 percent by weight, less than 1 percent by weight, less than 0.1 percent by weight of non-reactive VOCs, or is even entirely free of such solvents. Examples of such non-reactive volatile organic solvents include methanol, isopropanol, ethanol, and acetone.

The coatable composition is preferably applied with a substantially uniform thickness in a range of from 0.2 nm to 100 nm, although other thicknesses are permitted. Dried coatings with a thickness of less than about 10 nm may be helpful to avoid visible interference color variations in the dried coating. Preferably, sufficient coating composition is applied to result in a dried coating that is at least about 2 nm thick, preferably at least about 3 nm thick. The optimal average dried coating thickness may be dependent upon the particular coating composition, but in general the average thickness of the coating is preferably between 5 and 100 nm, preferably 5 to 50 nm, and more preferably from 5 to 25 nm, as estimated from atomic force microscopy and/or surface profilometry. Above this range coating thickness variations may cause optical interference effects, leading to visible iridescence (rainbow effect) of the dried coating which is particularly apparent on darker substrates. Below this range the coating thickness may be inadequate to confer sufficient durability for most coatings exposed to environmental wear.

Once the abraded surface is coated with the coatable composition, it is dried (by removal of water and any optional volatile organic solvent) sufficiently to provide a water-sheeting easy clean surface, preferably with sufficient durability to remain in place if rinsed with water. Drying may be accomplished by air drying (e.g., under ambient conditions) and/or by use of heating devices (e.g., portable heaters and or heat guns).

After coating the article is typically dried at ambient temperatures without the need for heat, radiation or other curing method. Although higher temperature may increase the speed of the drying process, such temperatures are usually not practical or convenient and care must be exercised to avoid damage to the substrate. After the coating composition is applied to the substrate and dried, the coating preferably comprises from about 30 to 95 percent by weight (more preferably from about 50 to 75 percent by weight) of silica nanoparticles; from about 1 to 55 percent by weight percent by weight (more preferably from about 25 to 50 percent by weight) of alkoxysilane oligomer; from 0.25 to 35 percent by weight of silane coupling agent; and from 0 to 10 percent by weight, preferably 1 to 5 percent by weight of the metal β-diketone complexing agent, and optionally about 0 to 5 percent by weight (more preferably from 0 to about 2 percent by weight) surfactant, and up to about 5 percent by weight (preferably 0 to 2 percent by weight) wetting agent.

The present disclosure also provides a kit comprising a suitable abrasive article according to the present disclosure and the coatable composition. The kit may further include directions for practicing at least one method according to the present disclosure. The coatable composition will generally be included in the kit within its own sealed container (e.g., a bottle or bag). In some embodiments, the entire kit may be contained within a single package.

Select Embodiments of the Present Disclosure

In a first embodiment, the present disclosure provides a method of providing an easy-clean, water-sheeting coating on a substrate, the method comprising steps:

a) abrading at least a portion of a surface of a substrate using an abrasive article to provide an abraded surface having a surface roughness $R_a$ in a range of from 10 nanometers to 3500 nanometers;

b) contacting a coatable composition with at least a portion of the abraded surface, wherein the coatable composition comprises silica particles, and wherein the silica particles have an average particle size of 100 nm or less; and c) at least partially removing water from the coatable composition to provide the easy-clean, water-sheeting coating on the substrate.

In a second embodiment, the present disclosure provides a method according to the first embodiment, wherein steps a) and b) are carried out simultaneously.

In a third embodiment, the present disclosure provides a method according to the first embodiment, wherein steps a) and b) are carried out consecutively.

In a fourth embodiment, the present disclosure provides a method according to any one of the first to third embodiments, wherein the surface roughness $R_a$ is in the range of from 100 nanometers to 1000 nanometers.

In a fifth embodiment, the present disclosure provides a method according to any one of the first to third embodiments, wherein the surface roughness $R_a$ is in the range of from 200 nanometers to 600 nanometers.

In a sixth embodiment, the present disclosure provides a method according to any one of the first to fifth embodiments, wherein the coatable composition is preparable by combining components:

a) an aqueous dispersion comprising silica nanoparticles, wherein the aqueous dispersion of silica nanoparticles has a pH of less than 7.5, and wherein the silica nanoparticles have an average particle diameter of 40 nanometers or less;

b) alkoxysilane oligomer; and c) silane coupling agent.

In a seventh embodiment, the present disclosure provides a method according to the sixth embodiment, wherein the coatable composition further comprises a metal β-diketone complexing agent.

In an eighth embodiment, the present disclosure provides a method according to the sixth embodiment, wherein the coatable composition comprises, on a solids weight basis:

30 to 95 percent of the silica nanoparticles;
1 to 55 percent of the alkoxysilane oligomer; and
0.25 to 35 percent of the silane coupling agent.

In a ninth embodiment, the present disclosure provides a method according to the eighth embodiment, wherein the coatable composition further comprises, on a solids weight basis:

0.1 to 10 percent of the metal β-diketone complexing agent.

In a tenth embodiment, the present disclosure provides a method according to any one of the sixth to ninth embodiments, wherein the alkoxysilane oligomer is represented by the formula:

wherein:
each $R^1$ is independently H or an alkyl group having from 1 to 4 carbon atoms;

each $R^2$ is independently an alkyl group having from 1 to 4 carbon atoms;
x is an integer from 2 to 100, inclusive; and
y and z are independently integers greater than or equal to zero;
wherein x is greater than y+z, and wherein x+y+z is in the range of from 2 to 100, inclusive.

In an eleventh embodiment, the present disclosure provides a method according to any one of the sixth to tenth embodiments, wherein said silane coupling agent is represented by the formula:

wherein:
Y comprises a monvalent organic residue comprising at least one of an epoxy group, an acid group, a hydroxyl group, a mercapto group, an alkyl group having from 1 to 18 carbon atoms, an aryl group having from 6 to 14 carbon atoms, or a free-radically polymerizable ethylenically-unsaturated group;
$R^3$ is a covalent bond or a di- or trivalent hydrocarbon bridging group;
$R^4$ is independently an alkyl, aryl, or aralkyl group of 1 to 8 carbon atoms optionally substituted in available positions by oxygen, nitrogen and/or sulfur atoms;
b is 1, 2, or 3;
c is 1 or 2; and
d is 1 or 2, wherein (b+d)≤4.

In a twelfth embodiment, the present disclosure provides a method according to any one of the first to eleventh embodiments, wherein the silica nanoparticles have an average particle diameter of 30 nanometers or less.

In a thirteenth embodiment, the present disclosure provides a method according to any one of the first to eleventh embodiments, wherein the silica nanoparticles have an average particle diameter of 20 nanometers or less.

In a fourteenth embodiment, the present disclosure provides a method according to any one of the first to eleventh embodiments, wherein the silica nanoparticles have an average particle diameter of 10 nanometers or less.

In a fifteenth embodiment, the present disclosure provides a method according to any one of the first to fourteenth embodiments, wherein the coatable composition further comprises a water-soluble organic solvent.

In a sixteenth embodiment, the present disclosure provides a method according to any one of the first to fifteenth embodiments, wherein the coatable composition has a pH of less than 4.

In a seventeenth embodiment, the present disclosure provides a method according to the first embodiment, wherein the coatable composition comprises water, silica nanoparticles having a mean particle diameter of 40 nanometers or less dispersed in the water, and an acid having a $pK_a$ of <3.5 in an amount effective to produce a pH of less than 5.

In an eighteenth embodiment, the present disclosure provides a method according to the first embodiment, wherein based on the total weight of components a) to e), the coatable composition comprises:

a) 0.5 to 99 weight percent of water;
b) 0.1 to 20 weight percent of silica nanoparticles having an average particle diameter of 40 nm or less;
c) 0 to 20 weight percent of silica nanoparticles having an average particle diameter of 50 nm or more, wherein the sum of b) and c) is 0.1 to 20 weight percent;
d) a sufficient amount of an acid having a $pK_a$ of <3.5 to reduce the pH to less than 5; and e) 0 to 20 percent by weight of a tetraalkoxysilane, relative to the sum of b) and c).

In a nineteenth embodiment, the present disclosure provides a method according to any one of the first to eighteenth embodiments, wherein the substrate comprises a vehicle.

In a twentieth embodiment, the present disclosure provides a method according to any one of the first to nineteenth embodiments, wherein the abrasive article comprises shaped abrasive composite particles secured to a backing, wherein the shaped abrasive composite particles comprise abrasive particles retained in a binder, and wherein the abrasive particles have a median particle diameter $D_{50}$ in a range of from about 1 micron to about 202 microns.

In a twenty-first embodiment, the present disclosure provides a method according to any one of the first to twentieth embodiments, wherein the abrasive article is secured to a compressible resilient backup pad.

In a twenty-second embodiment, the present disclosure provides a method according to any one of the first to twenty-first embodiments, wherein the abrasive article comprises an abrasive disc.

In a twenty-third embodiment, the present disclosure provides a method according to any one of the first to twenty-second embodiments, wherein the abrasive article is driven by a power tool.

In a twenty-fourth embodiment, the present disclosure provides a kit comprising:
an abrasive article comprising abrasive particles secured to a backing by a binder; and
a coatable composition comprising silica particles, and wherein the silica particles have an average particle size of 100 nm or less.

In a twenty-fifth embodiment, the present disclosure provides a kit according to the twenty-fourth embodiment, wherein the coatable composition is preparable by combining components:
an aqueous dispersion comprising silica nanoparticles, wherein the silica nanoparticles have an average particle diameter of 40 nanometers or less;
alkoxysilane oligomer; and
silane coupling agent.

In a twenty-sixth embodiment, the present disclosure provides a kit according to the twenty-fifth embodiment, wherein the coatable composition further comprises
a metal β-diketone complexing agent.

In a twenty-seventh embodiment, the present disclosure provides a kit according to the twenty-fifth or twenty-sixth embodiment, wherein the coatable composition comprises, on a solids weight basis:
30 to 95 percent of the silica nanoparticles;
1 to 55 percent of the alkoxysilane oligomer; and
0.25 to 35 percent of the silane coupling agent.

In a twenty-eighth embodiment, the present disclosure provides a kit according to the twenty-seventh embodiment, wherein the coatable composition further comprises, on a solids weight basis:
0.1 to 10 percent of the metal β-diketone complexing agent.

In a twenty-ninth embodiment, the present disclosure provides a kit according to any one of the twenty-fifth to twenty-eighth embodiments, wherein the alkoxysilane oligomer is represented by the formula:

wherein:
each $R^1$ is independently H or an alkyl group having from 1 to 4 carbon atoms;
each $R^2$ is independently an alkyl group having from 1 to 4 carbon atoms;
x is an integer from 2 to 100, inclusive; and
y and z are independently integers greater than or equal to zero;
wherein x is greater than y+z, and wherein x+y+z is in the range of from 2 to 100, inclusive.

In a thirtieth embodiment, the present disclosure provides a kit according to any one of the twenty-fifth to twenty-ninth embodiments, wherein said silane coupling agent is represented by the formula:

wherein:
Y comprises a monvalent organic residue comprising at least one of an epoxy group, an acid group, a hydroxyl group, a mercapto group, an alkyl group having from 1 to 18 carbon atoms, an aryl group having from 6 to 14 carbon atoms, or a free-radically polymerizable ethylenically-unsaturated group;
$R^3$ is a covalent bond or a di- or trivalent hydrocarbon bridging group;
$R^4$ is independently an alkyl, aryl, or aralkyl group of 1 to 8 carbon atoms optionally substituted in available positions by oxygen, nitrogen and/or sulfur atoms;
b is 1, 2, or 3;
c is 1 or 2; and
d is 1 or 2, wherein (b+d)≤4.

In a thirty-first embodiment, the present disclosure provides a kit according to any one of the twenty-fourth to thirtieth embodiments, wherein the silica nanoparticles have an average particle diameter of 30 nanometers or less.

In a thirty-second embodiment, the present disclosure provides a kit according to any one of the twenty-fourth to thirtieth embodiments, wherein the silica nanoparticles have an average particle diameter of 20 nanometers or less.

In a thirty-third embodiment, the present disclosure provides a kit according to any one of the twenty-fourth to thirtieth embodiments, wherein the silica nanoparticles have an average particle diameter of 10 nanometers or less.

In a thirty-fourth embodiment, the present disclosure provides a kit according to any one of the twenty-fourth to thirty-third embodiments, wherein the coatable composition further comprises a water-soluble organic solvent.

In a thirty-fifth embodiment, the present disclosure provides a kit according to any one of the twenty-fourth to thirty-fourth embodiments, wherein the coatable composition has a pH of less than 4.

In a thirty-sixth embodiment, the present disclosure provides a kit according to any one of the twenty-fourth to thirty-fifth embodiments, wherein the coatable composition comprises water, silica nanoparticles having a mean particle diameter of 40 nanometers or less dispersed in the water, and an acid having a $pK_a$ of <3.5 in an amount effective to produce a pH of less than 5.

In a thirty-seventh embodiment, the present disclosure provides a kit according to the twenty-fourth embodiment, wherein based on the total weight of components a) to e), the coatable composition comprises:
a) 0.5 to 99 weight percent of water;
b) 0.1 to 20 weight percent of silica nanoparticles having an average particle diameter of 40 nm or less;
c) 0 to 20 weight percent of silica nanoparticles having an average particle diameter of 50 nm or more, wherein the sum of b) and c) is 0.1 to 20 weight percent;
d) a sufficient amount of an acid having a $pK_a$ of <3.5 to reduce the pH to less than 5; and
e) 0 to 20 percent by weight of a tetraalkoxysilane, relative to the sum of b) and c).

In a thirty-eighth embodiment, the present disclosure provides a kit according to any one of the twenty-fourth to thirty-seventh embodiments, wherein the abrasive article comprises shaped abrasive composite particles secured to the backing, wherein the shaped abrasive composite particles comprise the abrasive particles retained in the binder, and wherein the abrasive particles have a median particle diameter $D_{50}$ in the range of from about 1 micron to about 202 microns.

In a thirty-ninth embodiment, the present disclosure provides a kit according to any one of the twenty-fourth to thirty-eighth embodiments, wherein the abrasive article comprises an abrasive disc.

In a fortieth embodiment, the present disclosure provides a kit according to any one of the twenty-fourth to thirty-ninth embodiments, further comprising:
instructions to perform a method comprising:
abrading a surface of a substrate with the abrasive article to provide an abraded surface; and
applying the coatable composition to at least a portion of the abraded surface.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.
The following abbreviations are used to describe the examples: ° C.=degrees Centigrade; cm=centimeter; mg=milligram; mL=milliliter; mm=millimeter; μm=micron; nm=nanometer; kPa=kilopascal; psi=pounds per square inch; rpm=revolutions per minute; W=Watt; and wt. %=weight percent.
The abrasive discs and accessories used to prepare the various test panels described herein were obtained under the following trade designations from 3M Company, St. Paul, Minn. Unless otherwise noted, the discs and accessories were 6-inch (15.24 cm) diameter:
P5000: TRIZACT FOAM DISC 443SA 5000, PART No. 30662.
P3000: TRIZACT FOAM DISC 443SA P3000, PART No. 02085.
P1500: TRIZACT CLEARCOAT SANDING DISC P1500, PART No. 02088.
P1200: P1200 FINISHING FILM DISC 260L, PART No. 00968.
P1000: P1000 FINISHING FILM DISC 260L, PART No. 00969.
P800: P800 FINISHING FILM DISC 260L, PART No. 00970.
P600: P600 FINISHING FILM DISC 260L, PART No. 00971.
Backup Pad: Trade designation HOOKIT BACKUP PAD, PART No. 05551.
Interface Pad: Trade designation HOOKIT SOFT INTERFACE PAD, PART No. 05777.
Abrasive Sander: A random orbit sander with 8 mm throw, model number DYNORBITAL SANDER, PART No. 56964 from Dynabrade, Inc., Clarence, N.Y. Line pressure was 40 psi (275.8 kPa).
Compounding Pad: An 8-inch (20.32 cm) foam compounding pad, trade designation FOAM COMPOUNDING PAD, PART No. 05723.
Compounding Backup Pad: An 8-inch (20.32 cm) backup pad, trade designation PERFECT-IT BACKUP PAD, PART No. 05718.
Compounding Sander: A model DW849 sander/polisher obtained from DeWALT Industrial Tool Company, Baltimore, Md., fitted with a ⅝-inch (1.59 cm) adapter, operated at 1400 rpm.
Test panels described herein were as follows:
TP1: 18 by 24 inch (45.7 cm by 61 cm) black painted, cold roll steel test panels, having a urethane acrylate clear coat, Part No. RK8148 obtained from ACT Laboratories, Inc., Hillsdale, Mich.
TP2: 30 inches×30 inches×50 mils (76.2 by 76.2 cm by 1.27 mm) clear colorless acrylic sheets, obtained under the trade designation "OPTIX" from Plastkolite, Inc., Columbus, Ohio.
Materials used to prepare the nanoparticle suspensions were as follows:
AAA: Aluminum acetylacetonate.
IPA: Isopropanol.
N1115: 4 nm colloidal silica, obtained as Nalco 1115 from Nalco Chemical Company, Naperville, Ill.
N2327: 20 nm colloidal silica, obtained as Nalco 2327 from Nalco Chemical Company.
ST-20L 45 nm colloidal silica, obtained as SNOWTEX ST-20L from Nissan Chemical Company.
ST-UP 40-100 nm×9-15 nm elongated colloidal silica, obtained under the trade description SNOWTEX UP-10 from Nissan Chemical America Corporation, Houston, Tex.
TEOS: Tetraethyl orthosilicate, available from Aldrich Chemical Co., Milwaukee, Wis.
VTMOS: Vinyltrimethoxysilane, obtained from Huls America, Inc., Bristol, Pa.
The hydrophilic solutions used to treat the test panels described herein were prepared as follows:
Solution A
To a stirred, 1-liter round bottom flask fitted with a stirrer, thermometer and condenser was added 12.67 g of isopropyl alcohol followed by 0.42 g of tetraethyl orthosilicate, and 0.08 g of vinyltrimethoxysilane. A 10 weight percent (wt. %) solution of aluminum acetylacetonate in methanol (0.16 g) was then added with stirring. Next, a mixture of 81.25 g of deionized water and 1.5 g 1.0 N hydrochloric acid was added slowly with continued stirring. Finally, 3.92 g of N1115 was added dropwise to the mixture. With continued stirring, the temperature of the flask was raised to 60° C. for 4 hrs. Next, the heat is removed and the contents of the flask were allowed to cool.
Solution B
A 1.0 wt. %, colloidal silica suspension was prepared by mixing 4.67 g of N1115 with 1.5 g of ST-20L with stirring. To the mixture was added a premix of 92.3 g of deionized water and 1.5 g of 1N hydrochloric acid with rapid stirring to adjust the pH to approximately 3.0.

Solution C

A 1.0 wt. %, colloidal silica suspension was prepared by mixing 4.67 g of N1115 with 0.75 g of N2327 with stirring. To the mixture was added a premix of 93.1 g of deionized water and 1.5 g of 1N hydrochloric acid with rapid stirring to adjust the pH to approximately 3.0.

Solution D

A 1.0 wt. %, colloidal silica suspension was prepared by mixing 4.67 g of N1115 with 1.5 g of ST-UP with stirring. To the mixture was added a premix of 92.3 g of deionized water with 1.5 g of 1N hydrochloric acid with rapid stirring to adjust the pH to approximately 3.0.

Test Procedures

Wet Soil Retention Test

In order to emulate conditions of road splash or spray, test panels were subjected to soiling as follows. A 2 wt. % aqueous suspension of a soiling material, obtained as STANDARD CARPET DRY SOIL, Part. No. SPS-2001 from 3M Company was sprayed onto a test panel for 2 seconds at 20 psi (137.9 kPa) by means of a 3M BODY SCHUTZ APPLICATOR GUN, Part No. 08997, from 3M Company, with the nozzle tip at approximately 29 inches (73.66 cm) from the panel. The water/soil mixture was kept agitated in a tank measuring 32 in×15 in×10.5 in (81 cm×38 cm×27 cm). The panel was removed and dried for 5 minutes at 50° C., after which the soil spraying and drying steps were then repeated. The test panel was then loaded into a separate water tank measuring 33 in×16 in×14 in (84 cm×41 cm×36 cm), cleaned by spraying with tap water at 60 psi (413.7 kPa) for 5 seconds with the nozzle tip at a distance of 32 inches (81 cm) from the panel, dried for 5 minutes at 50° C., and then imaged and analyzed according to the Gray Scale Analysis procedure (below) to determine the amount of soil retained after the soiling and cleaning steps. The 85° gloss was measured on one representative panel from each example selected, and the reduction in 85° gloss due to soil retained on the surface of the test panel was calculated. This value is reported as % reduction in 85° Gloss in Table 3.

Dirt Retention Test

Ten grams of STANDARD CARPET DRY SOIL, Part No. SPS-2001 from 3M Company was homogeneously mixed in a one-liter container with 200 grams of glass beads, obtained as AASHTO M247 TYPE I GLASS BEADS from Flexolite, Inc., St. Louis, Mo. The mixture and the test panel were then allowed to equilibrate for 24 hours at 25° C./50% relative humidity. The test panel was then fully immersed into the soil mixture, manually shaken for 30 seconds, the panel removed and tapped on one end to remove loosely bound dirt. The panel was then evaluated for transmissivity.

Dust Retention Test

A one-liter container was partially filled with a 0-20 μm standard test dust available as 12103-1 A1 ULTRAFINE DUST from Powder Technology, Inc., Burnsville, Minn. The test panel and the test dust were equilibrated for 24 hrs at 25° C./50% relative humidity. The panel was then immersed in the test dust, manually shaken for 30 seconds, removed from the container and tapped on one end to remove loosely bound dust. The panels were then evaluated for transmissivity or imaged and analyzed according to the Gray Scale Analysis procedure (below) to determine the amount of soil retained after the soiling and cleaning steps.

Gray Scale Analysis

1. Of the Wet Soil Retention Test

TP1 test panels were subjected to the Wet Soiling test described earlier, dried and photographed as described below. Because the TP1 test panels are black, any residual soil on the surface is lighter in tone and therefore exhibits a higher gray scale value than the black background. Image analysis of the test panels then provides a distribution of grayscale values related to the residual soil. Each gray scale distribution, in the form of a histogram of counts vs. grayscale value, can be analyzed for the mean of the distribution as well as the standard deviation. The mean value relates to the amount of soil remaining; higher numerical values of the mean of the distribution relates to the amount of remaining soil. The standard deviation value relates to the visual homogeneity of the sample, higher values of standard deviation relate to less homogenous distributions that is, more soiled in appearance. For accuracy, the pooled standard deviation, taken from three panels per Example, was determined. The smaller the pooled value the more uniform and visually acceptable the panel. Conversely, a large pooled standard deviation represents uneven and inhomogeneous visual appearance, which is less desirable.

Surface digital images (3008×2000 pixels) of the test panel were taken using a Nikon D70s camera (Nikon Corp, Tokyo, Japan) fitted with an 18-70 mm IF-ED AF-S DX Zoom lens. Stage illumination was provided by a Polaroid MP-4 Land Camera stage (Polaroid Corp., Norwood, Mass.) with lighting arms on both sides set at an approximately 45 degree angle. Four 150 W incandescent flood bulbs were elevated to about 15 degrees relative to the arm angle, for an overall angle of about 60 degrees incident to the panel, with a light diffusing box around the stage and the camera lens 20 cm from the stage platform. Gray scale analysis of a representative 1600 by 1100 pixel section of the photographic image was made using public domain ImageJ software (available from the U.S. National Institute for Health, Bethesda, Md.). Gray scale values ranged from 0 (most black) to 255 (most white). The high value "tail" of the distributions described above (summation of values between 100 and 255) was also calculated from the data and reported in Table 3 as Counts 100-255. The lower this value, the less soiling remained after rinsing. The pooled standard deviation is reported in Table 3.

2. Of the Dust Retention Test

Similarly to the wet soil retention test described above, TP1 test panels were treated as described and then subjected to dry dust testing and photographed. The same routine for grayscale analysis was performed from the digital images and the mean, counts 100-255 and pooled standard deviation are reported in Table 4.

Gloss

Gloss was measured using a model 4601 HAZE-GLOSS REFLECTOMETER from Byk Gardner USA, Inc., Columbia, Md. Three readings were taken per panel, and the average recorded. Gloss was measured at 20°, 60°, and/or 85°. The gloss of clean panels was measured and reported in Table 2.

Transmissivity

The transmissivity of TP2 panels was measured using a BPI DUAL COMPUTER-CAL II UV/visible digital spectrophotometer from Brain Power Incorporated, Miami, Fla. Except for Example 28, four readings were taken on each panel, wherein three panels were tested for each Example, and the resulting 12 measurements averaged. With respect to Example 12, only two panels were made, resulting in an average of 8 measurements.

Surface Roughness $R_a$ and Skewnesss $R_{sk}$

Surface profilometry measurements were obtained using a Wyko NT3300 optical profilometer from Veeco Instruments Inc., Plainview, N.J. The settings used were: 1× speed vertical scanning interferometry, full resolution, 2% modulation threshold, 50× objective with 0.5 field of view to generate a topography map area of 186×244 µm². Four measurements were made per panel and the average recorded.

Comparative Example A

A TP1 panel was cleaned with an automotive shampoo, obtained as 3M CAR WASH SOAP, Part No. 39000 from 3M Company, according to the manufacturer's instructions. The panel was then rinsed with water and wiped dry. The panel and the abrasive were sprayed with 5-10 grams water and then the panel was evenly abraded for approximately 60 seconds with the DYNORBITAL sander fitted with a backup pad, and an interface pad, using a P5000 abrasive disc. After sanding the panel was wiped with a paper towel, then cut into 3 by 4 inch (7.62 by 10.16 cm) sections. Each section was washed with the automotive shampoo, rinsed once with tap water, rinsed once with deionized water, and allowed to dry at 21° C.

Comparative Example B

The procedure generally described in Comparative Example A was repeated, wherein the P5000 abrasive disc was replaced with P3000.

Comparative Examples C-F

The procedure generally described in Comparative Example A was repeated, wherein the panel and abrasive were not sprayed with water and the P5000 abrasive disc was replaced as follows: Comparative Example C=P1200; Comparative Example D=P1000; Comparative Example E=P800; and Comparative Example F=P600.

Example 1

Comparative Example A was repeated, except that, after drying, three 3 by 4 inch (7.62 by 10.16 cm) sections were treated with Solution A as follows. Approximately 1-2 mL of Solution A was applied dropwise to the panel surface, and the solution was then wiped evenly across the panel surface while maintaining a wet film using a microfiber detailing cloth available as 3M DETAILING CLOTH, Part No. 06017 from 3M Company. The wet film dried after approximately 5 minutes at 21° C., and the panel was then allowed to dry for between 16-24 hours at 21° C. prior to testing.

Example 2

Example 1 was repeated, except that the TP1 Panel was abraded as in Comparative Example B.

Example 3

Example 1 was repeated, except that the TP1 Panel was abraded as in Comparative Example C.

Example 4

Example 1 was repeated, except that Solution B was used instead of Solution A.

Example 5

Example 1 was repeated, except that Solution C was used instead of Solution A.

Example 6

Example 1 was repeated, except that Solution D was used instead of Solution A.

Example 7

Example 1 was repeated, except that the TP1 Panel was abraded as in Comparative Example D.

Example 8

Example 1 was repeated, except that the TP1 Panel was abraded as in Comparative Example E.

Example 9

Example 1 was repeated, except that the TP1 Panel was abraded as in Comparative Example F.

Comparative Example G

A TP1 panel was prepared as described in Comparative Example C, except that after drying at 21° C., the panel sections were treated with an automotive wax, obtained under the trade designation MEGUIAR'S 21 MIRROR GLAZE from 3M Company, according to the manufacturer's instructions.

Comparative Example H

A TP1 panel was prepared as generally described in Comparative Example A, except the sander, 6-inch (15.24 cm) P5000 abrasive disc, interface pad and backup pad were replaced with the DW849 sander/polisher and the 8-inch (20.32 cm) compounding pad, and the panel was polished for 30 seconds with 18 grams rubbing compound available as PERFECT-IT RUBBING COMPOUND, PART No. 06095 from 3M Company. The panel was then polished a for an additional 30 seconds after applying an additional 15 grams rubbing compound to the panel, after which the panel was cleaned with an automotive adhesive and tar remover, also obtained from 3M Company, and washed with 3M Car Wash Soap.

Example 10

A panel was prepared as described in Comparative Example H, except that after the compounding step, three 3 by 4 inch (7.62 by 10.16 cm) sections of the panel were treated with Solution A.

Comparative Example I

A TP1 panel was washed with the 3M Car Wash Soap as in Comparative Example A, rinsed once with tap water, once with deionized water, allowed to dry at 21° C., after which three 3 by 4 inch (7.62 by 10.16 cm) sections were cut from the panel.

Comparative Example J

Comparative Example I was repeated, except that after the drying step, three 3 by 4 inch (7.62 by 10.16 cm) sections of the panel were treated with Solution A.

Comparative Example K

The protective liner was removed from one side of a TP2 panel, and the exposed surface of the panel was abraded and cleaned as described in Comparative Example A, except the P5000 abrasive disc was replaced with P1500. The protective liner was then removed from the opposing side of the panel and three 3 by 4 inch (7.62 by 10.16 cm) sections were cut from the panel.

Example 11

A panel was prepared as in Comparative Example K, except that during the abrading step, approximately 10 mL of water was replaced with Solution A which was applied to the abrasive disc and panel surface.

Example 12

A panel was prepared as generally described in Comparative Example K, except that after the drying step, each piece of the panel was treated with Solution A.

A summary of the various treatments used to prepare the Examples and Comparative Examples is reported in Table 1 (below).

TABLE 1

| EXAMPLE | PANEL | SURFACE PREPARATION | SURFACE TREATMENT |
|---|---|---|---|
| Comparative Example A | TP1 | P5000 | None |
| Example 1 | TP1 | P5000 | Solution A |
| Comparative Example B | TP1 | P3000 | None |
| Example 2 | TP1 | P3000 | Solution A |
| Comparative Example C | TP1 | P1200 | None |
| Example 3 | TP1 | P1200 | Solution A |
| Example 4 | TP1 | P1200 | Solution B |
| Example 5 | TP1 | P1200 | Solution C |
| Example 6 | TP1 | P1200 | Solution D |
| Comparative Example D | TP1 | P1000 | None |
| Example 7 | TP1 | P1000 | Solution A |
| Comparative Example E | TP1 | P800 | None |
| Example 8 | TP1 | P800 | Solution A |
| Comparative Example F | TP1 | P600 | None |
| Example 9 | TP1 | P600 | Solution A |
| Comparative Example G | TP1 | P1200 | Automotive Wax |
| Comparative Example H | TP1 | Buffing Compound | None |
| Example 10 | TP1 | Buffing Compound | Solution A |
| Comparative Example I | TP1 | Automotive Shampoo | None |
| Comparative Example J | TP1 | Automotive Shampoo | Solution A |
| Comparative Example K | TP2 | P1500 | None |

TABLE 1-continued

| EXAMPLE | PANEL | SURFACE PREPARATION | SURFACE TREATMENT |
|---|---|---|---|
| Example 11 | TP2 | | P1500 + Solution A applied during sanding |
| Example 12 | TP2 | P1500 | Solution A |

Test results according to the above-referenced test procedures for Examples 1-12 and Comparative Examples A-K are reported in Tables 2-5 (below), wherein "NM" means "not measured".

TABLE 2

| | ABRADED-UNCOATED ROUGHNESS | | GLOSS, gloss units | | |
|---|---|---|---|---|---|
| EXAMPLE | $R_a$, nm | $R_{sk}$ | 20° | 60° | 85° |
| Comparative Example A | 194 | −0.74 | 5.3 | 36.1 | 91.5 |
| Example 1 | 194 | −0.74 | 6.1 | 39.2 | 92.4 |
| Comparative Example B | 221 | −1.03 | 1.5 | 20.0 | 86.8 |
| Example 2 | 221 | −1.03 | 2.1 | 24.5 | 87.5 |
| Comparative Example C | 356 | −0.61 | 0.4 | 6.8 | 74.1 |
| Example 3 | 356 | −0.61 | 0.4 | 7.3 | 75.0 |
| Example 4 | 356 | −0.61 | 0.3 | 7.0 | 74.3 |
| Example 5 | 356 | −0.61 | 0.2 | 5.5 | 71.5 |
| Example 6 | 356 | −0.61 | 0.4 | 7.5 | 71.8 |
| Comparative Example D | 385 | −0.56 | 0.2 | 4.3 | 67.0 |
| Example 7 | 385 | −0.56 | 0.2 | 5.4 | 72.5 |
| Comparative Example E | 534 | −0.35 | 0.1 | 2.5 | 53.2 |
| Example 8 | 534 | −0.35 | 0.1 | 3.0 | 55.8 |
| Comparative Example F | 598 | −0.62 | 0.1 | 3.0 | 56.4 |
| Example 9 | 598 | −0.62 | 0.1 | 3.5 | 58.2 |
| Comparative Example G | 356 | 356 | 1.6 | 19.0 | NM |
| Comparative Example H | 11.7 | −0.39 | 72.3 | 86.4 | 96.4 |
| Example 10 | 11.7 | −0.39 | 68.0 | 84.8 | 98.0 |
| Comparative Example I | 8.0 | 0.46 | 89.7 | 93.8 | 99.2 |
| Comparative Example J | 8.0 | 0.46 | 85.8 | 92.6 | 98.7 |
| Comparative Example K | 268 | −0.83 | 4.9 | 13.7 | 66.2 |
| Example 11 | 274* | −0.33 | 5.6 | 14.6 | 70.8 |
| Example 12 | 268 | −0.83 | 6.5 | 16.5 | 71.2 |

*Example 11 is abraded with the coating solution present, and therefore the $R_a$ is not an uncoated surface roughness, but a coated surface roughness value.

TABLE 3

| | WET SOIL RETENTION TEST | | |
|---|---|---|---|
| EXAMPLE | Counts 100-225 | Pooled Std. Dev. | % Reduction in 85° Gloss |
| Comparative Example A | 10,200 | 14.5 | 32.2 |
| Example 1 | 510 | 4.3 | 22.6 |
| Comparative Example B | 3,520 | 9.9 | 24.2 |
| Example 2 | 225 | 4.2 | 17.6 |
| Comparative Example C | 3,110 | 10.5 | 32.9 |
| Example 3 | 240 | 4.8 | 19.6 |
| Example 4 | 230 | 6.2 | NM |
| Example 5 | 90 | 4.1 | NM |
| Example 6 | 510 | 5.3 | NM |

TABLE 3-continued

WET SOIL RETENTION TEST

| EXAMPLE | Counts 100-225 | Pooled Std. Dev. | % Reduction in 85° Gloss |
|---|---|---|---|
| Comparative Example D | 1,250 | 6.8 | 19.5 |
| Example 7 | 270 | 5.0 | 10.2 |
| Comparative Example E | 390 | 4.7 | 28.4 |
| Example 8 | 170 | 4.5 | 21.9 |
| Comparative Example F | 5,660 | 6.3 | 27.8 |
| Example 9 | 340 | 4.1 | 20.5 |
| Comparative Example G | 242,910 | 32.1 | NM |
| Comparative Example H | 51,820 | 27.6 | 50.4 |
| Example 10 | 400 | 5.6 | 27.0 |
| Comparative Example I | 108,600 | 30.6 | 53.4 |
| Comparative Example J | 920 | 7.4 | 29.4 |

TABLE 4

DUST RETENTION TEST

| EXAMPLE | Mean | Counts 100-225 | Pooled Std. Dev. |
|---|---|---|---|
| Comparative Example A | 23.0 | 3,380 | 6.6 |
| Example 1 | 5.0 | 13 | 2.0 |
| Comparative Example B | 19.3 | 3,400 | 7.3 |
| Example 2 | 6.1 | 30 | 2.6 |
| Comparative Example C | 17.8 | 160 | 3.5 |
| Example 3 | 7.3 | 245 | 3.2 |
| Comparative Example H | 22.2 | 2,420 | 6.1 |
| Example 10 | 1.5 | 5 | 1.8 |
| Comparative Example I | 16.1 | 2,180 | 7.2 |
| Comparative Example J | 2.3 | 725 | 4.0 |

TABLE 5

| | TRANSMISSIVITY | | | | | |
|---|---|---|---|---|---|---|
| | CLEAN PANEL CONTROL | | DUST RETENTION TEST | | DIRT RETENTION TEST | |
| EXAMPLE | Visible | UV | Visible | UV | Visible | UV |
| Comparative Example K | 85.3 | 44.0 | 54.8 | 33.1 | 41.8 | 22.0 |
| Example 11 | 84.5 | 41.8 | 71.6 | 38.7 | 65.3 | 33.0 |
| Example 12 | 87.5 | 43.3 | 85.0 | 43.9 | 80.3 | 41.5 |

All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of providing an easy-clean, water-sheeting coating on a substrate, the method comprising steps:
    a) abrading at least a portion of a surface of a substrate using an abrasive article to provide an abraded surface having a surface roughness $R_a$ in a range of from 10 nanometers to 3500 nanometers wherein the substrate comprises a vehicle with a polymeric clearcoat;
    b) contacting a coatable composition with at least a portion of the abraded surface, wherein the coatable composition comprises silica particles, and wherein the silica particles have an average particle size of 100 nm or less, wherein steps a) and b) are carried out simultaneously; and
    c) at least partially removing water from the coatable composition to provide the easy-clean, water-sheeting coating on the substrate,
    wherein the coatable composition does not comprise a least one of alkoxysilane oligomer or silane coupling agent.

2. The method of claim 1, wherein the coatable composition does not comprise alkoxysilane oligomer.

3. The method of claim 1, wherein the coatable composition does not comprise silane coupling agent.

4. The method of claim 1, wherein the coatable composition does not comprise alkoxysilane oligomer and silane coupling agent.

* * * * *

UNITED STATES PATENT AND TRADEMARK OFFICE
CERTIFICATE OF CORRECTION

PATENT NO. : 10,293,449 B2
APPLICATION NO. : 14/891608
DATED : May 21, 2019
INVENTOR(S) : Jay Schlechte et al.

Page 1 of 2

It is certified that error appears in the above-identified patent and that said Letters Patent is hereby corrected as shown below:

On the Title Page

Item (57), Column 2 (Abstract)
Line 4, Delete "R?a#191" and insert -- $R_a$ --, therefor.

In the Specification

Column 2
Line 36 (Approx.), Delete "and or" and insert -- and/or --, therefor.

Column 5
Line 48, Delete "JI5150," and insert -- JIS150, --, therefor.

Column 5
Lines 49-50, Delete "JI5220, JI5240, JI5280, JI5320, JI5360, JI5400, JI5600, JI5800," and insert -- JIS220, JIS240, JIS280, JIS320, JIS360, JIS400, JIS600, JIS800, --, therefor.

Column 5
Line 52, Delete "backing" and insert -- backing. --, therefor.

Column 7
Line 59, Delete "is contains" and insert -- contains --, therefor.

Column 9
Line 36 (Approx.), Delete "tetralkoxysilanes" and insert -- tetraalkoxysilanes --, therefor.

Column 10
Line 1, Delete "tetralkoxysilanes" and insert -- tetraalkoxysilanes --, therefor.

Signed and Sealed this
Eleventh Day of February, 2020

Andrei Iancu
*Director of the United States Patent and Trademark Office*

Column 10
Line 36, Delete "monvalent" and insert -- monovalent --, therefor.

Column 14
Line 34, Delete "and or" and insert -- and/or --, therefor.

Column 16
Line 15, Delete "monvalent" and insert -- monovalent --, therefor.

Column 18
Line 25, Delete "monvalent" and insert -- monovalent --, therefor.

Column 20
Line 29, Delete "Plastkolite," and insert -- Plaskolite, --, therefor.

Column 22
Line 65, Delete "Skewnesss" and insert -- Skewness --, therefor.

In the Claims

Column 28
Lines 39-40 (Approx.), In Claim 1, delete "a least" and insert -- at least --, therefor.